United States Patent
Kumar et al.

(10) Patent No.: US 9,034,786 B2
(45) Date of Patent: May 19, 2015

(54) CATALYSTS FOR PRODUCING HYDROGEN AND SYNTHESIS GAS

(71) Applicants: Prashant Kumar, Edmonton (CA); David Lynch, Burlington, CT (US)

(72) Inventors: Prashant Kumar, Edmonton (CA); David Lynch, Burlington, CT (US)

(73) Assignee: Enerkem, Inc., Montreal, Quebec (CA)

( * ) Notice: Subject to any disclaimer, the term of this patent is extended or adjusted under 35 U.S.C. 154(b) by 0 days.

(21) Appl. No.: 14/212,295

(22) Filed: Mar. 14, 2014

(65) Prior Publication Data

US 2014/0315711 A1 Oct. 23, 2014

Related U.S. Application Data

(60) Provisional application No. 61/802,857, filed on Mar. 18, 2013.

(51) Int. Cl.

| | |
|---|---|
| *B01J 23/00* | (2006.01) |
| *B01J 23/02* | (2006.01) |
| *B01J 23/06* | (2006.01) |
| *B01J 23/08* | (2006.01) |
| *B01J 23/40* | (2006.01) |
| *B01J 23/42* | (2006.01) |
| *B01J 23/56* | (2006.01) |
| *B01J 23/58* | (2006.01) |
| *B01J 20/00* | (2006.01) |
| *B01J 37/03* | (2006.01) |
| *B01J 37/10* | (2006.01) |
| *B01J 37/18* | (2006.01) |
| *B01J 23/10* | (2006.01) |
| *B01J 23/75* | (2006.01) |
| *B01J 23/755* | (2006.01) |
| *B01J 29/03* | (2006.01) |
| *B01J 35/00* | (2006.01) |
| *B01J 35/02* | (2006.01) |

(Continued)

(52) U.S. Cl.
CPC ........... *B01J 37/031* (2013.01); *B01J 23/78* (2013.01); *B01J 37/06* (2013.01); *B01J 37/10* (2013.01); *B01J 37/18* (2013.01); *B01J 23/02* (2013.01); *B01J 23/10* (2013.01); *B01J 23/75* (2013.01); *B01J 23/755* (2013.01); *B01J 29/0308* (2013.01); *B01J 29/0333* (2013.01); *B01J 35/002* (2013.01); *B01J 35/023* (2013.01); *B01J 35/1019* (2013.01); *B01J 35/1042* (2013.01); *B01J 35/1047* (2013.01); *B01J 35/1061* (2013.01); *B01J 37/0018* (2013.01); *B01J 2523/00* (2013.01); *Y10S 502/524* (2013.01)

(58) Field of Classification Search
USPC ......... 502/302–304, 327–328, 332, 335, 337, 502/341, 349, 355, 415, 524
See application file for complete search history.

(56) References Cited

U.S. PATENT DOCUMENTS

| | | | | |
|---|---|---|---|---|
| 5,395,813 | A | * | 3/1995 | Clavenna et al. ............. 502/335 |
| 5,607,892 | A | * | 3/1997 | Chopin et al. ................ 502/304 |

(Continued)

OTHER PUBLICATIONS

Kumar, et al., Energy & Fuels, vol. 22, pp. 3575-3582 (2008).

(Continued)

*Primary Examiner* — Cam N. Nguyen
(74) *Attorney, Agent, or Firm* — Raymond J. Lillie

(57) ABSTRACT

A catalyst which comprises nickel and/or cobalt supported on a support that includes a mixed oxide containing metals, such as aluminum, zirconium, lanthanum, magnesium, cerium, calcium, and yttrium. Such catalysts are useful for converting carbon dioxide to carbon monoxide, and for converting methane to hydrogen.

1 Claim, 12 Drawing Sheets

(51) Int. Cl.
*B01J 35/10* (2006.01)
*B01J 37/00* (2006.01)
*B01J 23/78* (2006.01)
*B01J 37/06* (2006.01)

(56) References Cited

U.S. PATENT DOCUMENTS

| | | | |
|---|---|---|---|
| 5,679,614 | A | 10/1997 | Bangala et al. |
| 6,294,140 | B1 * | 9/2001 | Mussmann et al. ........ 423/213.5 |
| 6,306,794 | B1 * | 10/2001 | Suzuki et al. ................ 502/304 |
| 6,326,329 | B1 * | 12/2001 | Nunan ........................... 502/242 |
| 6,528,451 | B2 * | 3/2003 | Brezny et al. ................. 502/304 |
| 7,824,656 | B2 | 11/2010 | Idem et al. |
| 8,137,655 | B2 | 3/2012 | Chornet et al. |
| 8,143,186 | B2 * | 3/2012 | Rytter ........................... 502/260 |
| 8,465,714 | B2 * | 6/2013 | Augustine ................... 423/239.1 |
| 2009/0232728 | A1 * | 9/2009 | Wagner et al. .............. 423/648.1 |
| 2012/0121500 | A1 * | 5/2012 | Wagner et al. ................ 423/655 |
| 2012/0129690 | A1 * | 5/2012 | Larcher et al. ................ 502/304 |
| 2014/0275584 | A1 * | 9/2014 | Beck et al. .................... 549/518 |

OTHER PUBLICATIONS

Li, et al., Inorganic Chemistry, vol. 48, No. 10, pp. 4421-4434 (2009).
Khan, et al., Energy & Fuels, vol. 26, pp. 365-379 (Nov. 16, 2011).
Sengupta, et al., Energy & Fuels, vol. 26, pp. 816-828 (Jan. 11, 2012).

* cited by examiner

CATALYSTS FOR PRODUCING HYDROGEN AND SYNTHESIS GAS

This application claims priority based on provisional application Ser. No. 61/802,857, filed Mar. 18, 2013, the contents of which are incorporated by reference in their entirety.

This invention relates to catalysts. More particularly, this invention relates to catalysts that include nickel and/or cobalt, and a support including a mixed oxide containing two or more metals. Such catalysts are useful especially in converting synthesis gas byproducts, such as carbon dioxide and methane, into hydrogen, carbon monoxide, and synthesis gas.

The term "mixed oxide", as used herein, means a compound containing oxygen and two or more other elements. At least some of the oxygen atoms may be bound covalently into oxoanions, and/or at least some of the oxygen atoms may be bound to one or more of the other elements, and/or at least some of the oxygen atoms may be bound as fine mixtures of two or more oxides. More particularly, as noted hereinabove, the mixed oxides employed in the present invention include two or more metals. Such metals include, but are not limited to, alkali metals, alkaline earth metals, transition metals, rare earth metals, and metals of the Lanthanide Series of the Periodic Table.

Synthesis gas may be produced by gasifying biomass (such as, for example, municipal solid waste or other refuse-derived products), or coal, in a gasifier, whereby a crude synthesis gas may be produced. In addition to hydrogen and carbon monoxide, the crude synthesis gas may include carbon dioxide as well as methane. Such a crude synthesis gas may have a low molar $H_2/CO$ ratio, and a high molar $CO_2/CO$ ratio. The "biogenic" $CO_2$ that is produced needs to be recycled into the synthesis gas production process in order to improve the CO content for downstream carbonylation as well as to reduce greenhouse gas emissions.

Also, the gasification process generates methane, which is not reformed without a catalyst under typical biomass gasification conditions (e.g., less than 1,100° C. and less than 3 bar pressure). The methane in general is collected as tail gas. The "biogenic" methane may be a good source of hydrogen for hydrogenation reactions, such as, for example, in producing alcohols such as ethanol from acetates.

It is an object of the present invention to provide a catalyst which may be used in the reforming of carbon dioxide and methane in order to produce carbon monoxide, hydrogen, or synthesis gas. Thus, in accordance with an aspect of the present invention, there is provided a catalyst that comprises at least one catalytic metal. The at least one catalytic metal is selected from the group consisting of nickel, cobalt, or a combination of nickel and cobalt. The catalyst also comprises a support that includes a mixed oxide containing at least three metals. The at least three metals are selected from the group consisting of aluminum, zirconium, lanthanum, magnesium, cerium, calcium, and yttrium, with the proviso that, when the support contains only three metals, the three metals are not aluminum, lanthanum, and magnesium.

In a non-limiting embodiment, the at least one catalytic metal is nickel. In another non-limiting embodiment, the at least one catalytic metal is cobalt. In yet another non-limiting embodiment, the at least one catalytic metal is a combination of nickel and cobalt In another non-limiting embodiment, the support includes a mixed oxide containing aluminum, calcium, and magnesium. In another non-limiting embodiment, the mixed oxide further contains lanthanum.

In another non-limiting embodiment, the support includes a mixed oxide containing cerium, lanthanum, and zirconium.

In another non-limiting embodiment, the support includes a mixed oxide containing aluminum, cerium, zirconium, and calcium.

In another non-limiting embodiment, the support includes a mixed oxide containing cerium, zirconium, and aluminum. In yet another non-limiting embodiment, the mixed oxide further contains magnesium.

In yet another non-limiting embodiment, the at least one catalytic metal is nickel and the support includes a mixed oxide containing magnesium, lanthanum, calcium, and aluminum. In a further non-limiting embodiment, the catalyst, on a metal basis, includes 5 atom % nickel, 20 atom % magnesium, 20 atom % lanthanum, 5 atom % calcium, and 50 atom % aluminum.

In another non-limiting embodiment, the at least one catalytic metal is nickel, and the support includes a mixed oxide containing cerium, lanthanum, and zirconium. In a further non-limiting embodiment, the catalyst includes, on a metal basis, 5 atom % nickel, 50 atom % cerium, 15 atom % lanthanum, and 30 atom % zirconium.

In another non-limiting embodiment, the at least one catalytic metal is nickel, and the support includes a mixed oxide containing magnesium, cerium, zirconium, and aluminum. In a further non-limiting embodiment, the catalyst includes, on a metal basis, 2 atom % nickel, 60 atom % magnesium, 5 atom % cerium, 3 atom % zirconium, and 30 atom % aluminum.

In accordance with another aspect of the present invention, there is provided a catalyst that includes nickel, cobalt, and a mixed oxide containing magnesium and aluminum. The catalyst includes, on a metal basis, 4 atom % nickel, 3 atom % cobalt, 60 atom % magnesium, and 33 atom % aluminum.

The catalysts of the present invention, in a non-limiting embodiment, may be made by preparing the supports by a surfactant assisted templating process, followed by treating the materials at high temperature (up to 650° C.) in the presence of air to remove impurities generally present on the support surface during the templating process. The supports then are treated thermally in order to impregnate the nickel and/or cobalt at desired concentrations. It is to be understood, however, that the scope of the present invention is not to be limited to any particular method of making the catalysts.

The catalysts may be used in conjunction with various reactions, and in particular, in conjunction with reforming reactions in which carbon monoxide and/or methane are subjected to reforming to produce carbon monoxide and/or hydrogen. Such reactions include, but are not limited to, dry reforming, steam aided reforming, oxygen aided reforming, steam and oxygen aided reforming, and autothermal reforming. It is to be understood, however, that the scope of the present invention is not to be limited to any particular reaction, reactants, or products.

BRIEF DESCRIPTION OF THE DRAWINGS

The invention now will be described with respect to the drawings, wherein.

EXAMPLES

Figure 1:
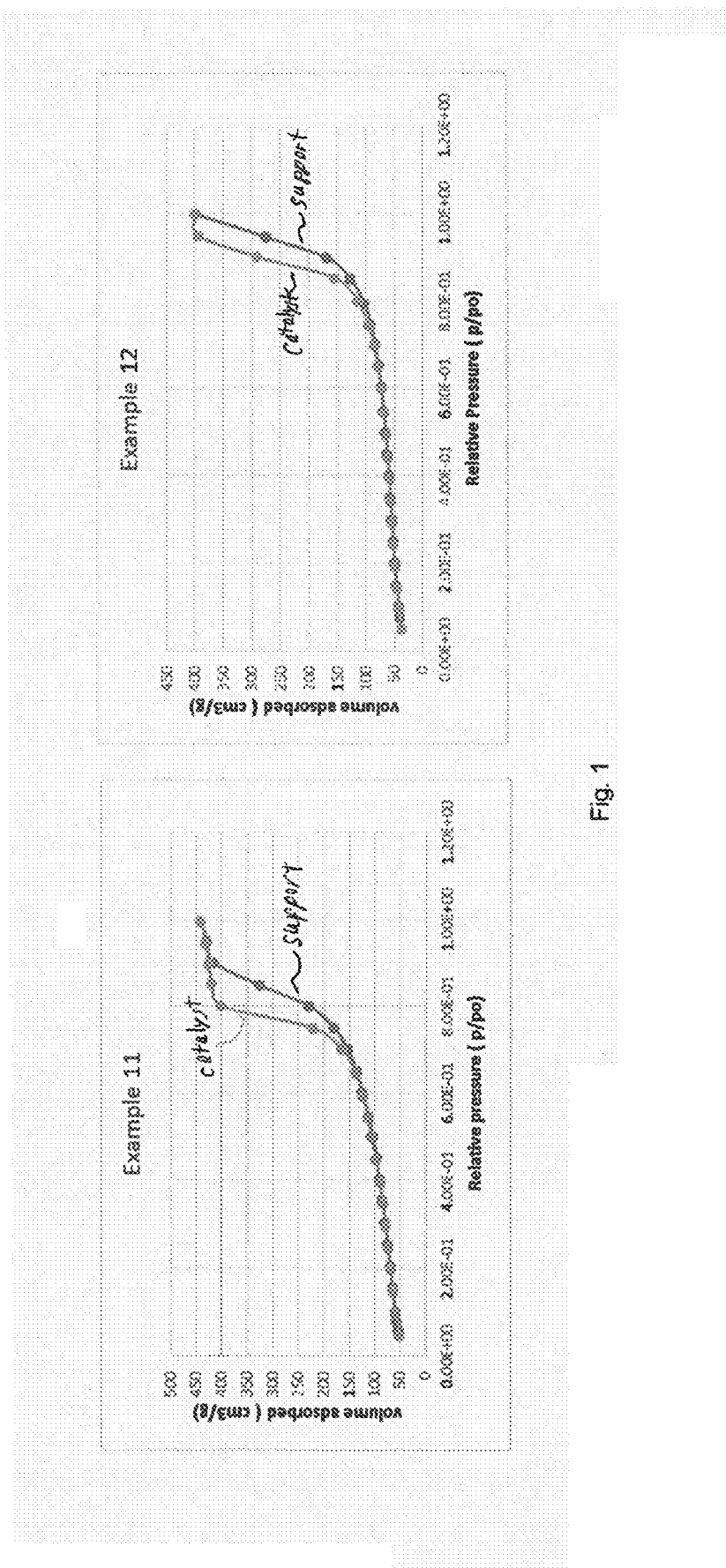
FIG. 1 shows graphs of nitrogen adsorption/desorption isotherms of calcined supports and catalysts of Examples 11 and 12.

The invention now will be described with respect to the following examples. It is to be understood, however, that the scope of the present invention is not intended to be limited thereby.

Example 1

A mixed oxide based on an $Al_{0.5}Ca_{0.5}O_2$ binary was prepared by surfactant assisted templating under basic conditions. Aluminum nitrate hexahydrate and calcium nitrate tetrahydrate precursors were employed to prepare the above catalyst. The aluminum nitrate salt (10.6 g) and calcium nitrate salt (12.0 g) were dissolved separately in deionized water (500 ml each) and mixed together to obtain a 1 liter solution. In a separate beaker, 45 g of cetyl trimethyl ammonium bromide (CTAB) surfactant was dissolved in 1 liter of deionized water at 60° C. The above two solutions were mixed together to obtain a 2 liter solution. Aqueous ammonia (25 vol. %) was added gradually to the solution under vigorous stirring until precipitation was complete (pH 11.6). The precipitate was a gelatinous white-brown colloidal slurry. The slurry was stirred for 60 minutes in a glass reactor, and then transferred into Pyrex glass bottles, and sealed and aged hydrothermally in an air circulated oven for 5 days at 90° C. The mixture then was cooled and the resulting precipitate was filtered and washed repeatedly with warm deionized water. The resulting cakes were oven dried at 120° C. for 12 hours and then calcined at 650° C. for 3 hours in an air environment.

Example 2

A catalyst support was prepared as in Example 1, except that a magnesium nitrate hexahydrate solution (3.9 g in 250 ml deionized water) was added to an aluminum nitrate nonahydrate solution (10.6 g in 500 ml deionized water) and a calcium nitrate tetrahydrate (8.3 g in 250 ml deionized water) solution. The amount of CTAB surfactant was increased in order to maintain a surfactant to Al, Ca, and Mg ratio of 1.25. The nominal composition of the mixed oxide was $Al_{0.5}Ca_{0.35}Mg_{0.15}O_2$.

Example 3

A catalyst support was prepared as described in Example 2, except that a zirconium nitrate hydrate solution (3.5 g in 250 ml deionized water) was added to 7.4 g of aluminum nitrate in 250 ml deionized water, 3.8 g of magnesium nitrate in 250 ml deionized water, and 8.3 g of calcium nitrate in 250 ml deionized water. The amount of CTAB surfactant used was increased in order to maintain a surfactant to metal (Al, Ca, Zr and Mg) ratio of 1.25. The nominal composition of the mixed oxide was $Al_{0.35}Ca_{0.35}Mg_{0.15}Zr_{0.15}O_2$.

Example 4

A catalyst support was prepared as described in Example 3, except that a cerium nitrate hexahydrate (6.5 ml in 250 ml deionized water) solution was added to aluminum nitrate (7.4 g in 500 ml deionized water), magnesium nitrate (3.8 g in 250 ml deionized water), zirconium nitrate (3.5 g in 250 ml deionized water), and calcium nitrate (4.7 g in 250 ml deionized water) solutions. The amount of CTAB surfactant used was increased in order to maintain the ratio of surfactant to metal (Al, Ce, Mg, Zr, and Ca) of 1.25. The nominal composition of the mixed oxide obtained was $Al_{0.35}Ca_{0.20}Ce_{0.15}Mg_{0.15}Zr_{0.15}O_2$.

Example 5

A catalyst support was prepared as described in Example 4, except that a lanthanum nitrate hexahydrate (6.49 g in 250 ml deionized water) solution was added to aluminum nitrate nonahydrate (4.3 g in 500 ml deionized water), magnesium nitrate (3.8 g in 250 ml deionized water), zirconium nitrate (3.5 g in 250 ml deionized water), cerium nitrate (6.52 in 250 ml in deionized water), and calcium nitrate (4.7 g in 250 ml deionized water) solutions. The amount of CTAB surfactant was increased in order to maintain the surfactant to metal (Al, Ce, La, Mg, Zr, and Ca) at 1.25. The nominal composition of the mixed oxide obtained was $Al_{0.20}Ca_{0.20}Ce_{0.15}Mg_{0.15}La_{0.15}Zr_{0.15}O_2$.

Example 6

A catalyst support was prepared as described in Example 5, except that a yttrium nitrate solution (5.7 g in 500 ml deionized water) was added to the aluminum nitrate nonahydrate (4.3 g in 500 ml deionized water), magnesium nitrate hexahydrate (3.8 g in 250 ml deionized water), zirconium nitrate hydrate (3.5 g in 250 ml deionized water), cerium nitrate hexahydrate (6.52 g in 250 ml deionized water), and calcium nitrate tetrahydrate (1.2 ml in 100 ml deionized water) solutions. The amount of CTAB surfactant was increased in order to maintain the ratio of surfactant to metal (Al, Ce, Y, Mg, Zr, and Ca) at 1.25. The nominal composition of the mixed oxide obtained was $Al_{0.20}Ca_{0.5}Ce_{0.15}Mg_{0.15}Zr_{0.15}Y_{0.15}O_2$.

Example 7

A catalyst support was prepared as described in Example 4, except that a lanthanum nitrate solution (4.3 g in 500 ml deionized water) was added to aluminum nitrate (13.8 g in 250 ml deionized water), magnesium nitrate (2.6 g in 250 ml deionized water), and calcium nitrate (3.5 g in 250 ml deionized water) solutions. The amount of CTAB surfactant used was increased in order to maintain the surfactant to metal (Al, La, Mg and Ca) ratio at 1.25. The nominal composition of the mixed oxide obtained was $Al_{0.65}Ca_{0.15}Mg_{0.1}La_{0.1}O_2$.

Each of the catalyst supports of Examples 1 through 7 was divided into three portions (2 g each) and each portion of each support was treated with nickel oxide, cobalt oxide, or a mixture of nickel oxide and cobalt oxide by using a wetness impregnation technique. When only nickel was added, the amount of nickel metal was based on 5 wt % of Ni impregnated on 1.9 g of support. The required amount of nickel nitrate hexahydrate used was 0.5 g dissolved in 10 mL of deionized water. The wet sample (support and nickel nitrate solution) was stirred further overnight at room temperature to obtain a homogeneous precipitate which was dried further overnight at 110° C. to remove the remaining moisture. In a few examples both Ni (wt 5%) and Co (wt 3%) were impregnated simultaneously by dissolving 0.5 g nickel nitrate hexahydrate and 0.3 g cobalt nitrate hexahydrate in 5 mL each of deionized water. These two solutions were mixed prior to wetness impregnate by using 1.84 g of support. The catalysts then were cleaned further at 650° C. for 3 hours in the pres-

Example 8

A mixed oxide based on an $Al_{0.6}Mg_{0.4}O_2$ binary oxide was prepared by surfactant assisted templating under basic conditions. Aluminum nitrate nonahydrate and magnesium nitrate hexahydrate precursors were employed to prepare the above support. The aluminum nitrate salt (8.5 g) and magnesium nitrate salt (15.4 g) were dissolved separately in deionized water (500 mL each) and mixed together to obtain 1 L solution. In a separate beaker, 45 g of cetyltrimethylammonium bromide (CTAB) surfactant was dissolved in 1 L of deionized water at 60° C. The above two solutions were mixed together to obtain a 2 L solution. An aqueous ammonia solution (25 vol %) was added gradually to the solution under vigorous stirring until precipitation was complete (pH 11.6). The precipitate obtained was a gelatinous white-brown colloidal slurry. The slurry was stirred for 60 minutes in a glass reactor, and then transferred into Pyrex glass bottles, and sealed and aged hydrothermally in an air circulated oven for 5 days at 90° C. The mixture was then cooled and the resulting precipitate was filtered and washed repeatedly with warm deionized water. The resulting cakes were oven dried at 120° C. for 12 hours and then calcined at 650° C. for 3 hours in an air environment. The support material obtained then was wetness impregnated with metal salt solutions of nickel and cobalt nitrates simultaneously as hereinabove described. The prepared catalyst obtained had a nominal loading of 3 wt % Co and 4 wt % Ni.

Example 9

A mixed oxide based on an $Al_{0.5}Mg_{0.25}La_{0.25}O_2$ ternary oxide was prepared by surfactant assisted templating under basic conditions. Aluminum nitrate nonahydrate, lanthanum nitrate hexahydrate and magnesium nitrate hexahydrate precursors were employed to prepare the above support. The aluminum nitrate salt (10.6 g), lanthanum nitrate salt (10.8 g) and magnesium nitrate salt (6.4 g) were dissolved separately in deionized water (400 mL each) and mixed together to obtain a 1.2 L solution. In a separate beaker, 45 g of cetyltrimethylammonium bromide (CTAB) surfactant was dissolved in 1 L of deionized water at 60° C. The above two solutions were mixed together to obtain a 2.2 L solution. An aqueous ammonia (25 vol. %) then was added gradually to the solution under vigorous stirring until precipitation was complete (pH 11.6). The precipitate obtained was a gelatinous white-brown colloidal slurry. The slurry was stirred for 60 minutes in a glass reactor, and then transferred into Pyrex glass bottles, and sealed and aged hydrothermally in an air circulated oven for 5 days at 90° C. The mixture then was cooled and the resulting precipitate was filtered and washed repeatedly with warm deionized water. The resulting cakes were oven dried at 120° C. for 12 hours and then calcined at 650° C. for 3 hours in an air environment. The support material obtained then was wetness impregnated with metal salt solutions of nickel and cobalt nitrates simultaneously as hereinabove described. The prepared catalyst obtained had a nominal loading of 4 wt % Co and 4 wt % Ni.

Example 10

A mixed oxide based on a $Ce_{0.5}Zr_{0.3}La_{0.2}O_2$ ternary oxide was prepared by surfactant assisted templating under basic conditions. Cerium nitrate hexahydrate, lanthanum nitrate hexahydrate, and zirconium nitrate hydrate precursors were employed to prepare the above support. The cerium nitrate salt (21.0 g), lanthanum nitrate salt (8.6 g) and zirconium nitrate salt (6.9 g) were dissolved separately in deionized water (400 mL each) and mixed together to obtain a 1.2 L solution. In a separate beaker, 45 g of cetyltrimethylammonium bromide (CTAB) surfactant was dissolved in 1 L of deionized water at 60° C. The above two solutions were mixed together to obtain a 2.2 L solution. An aqueous ammonium solution (25 vol. %) then was added gradually to the solution under vigorous stirring until precipitation was complete (pH 11.6). The precipitate obtained was a gelatinous white-brown colloidal slurry. The slurry was stirred for 60 minutes in a glass reactor, and then transferred into Pyrex glass bottles and sealed and aged hydrothermally in an air-circulated oven for 5 days at 90° C. The mixture then was cooled and the resulting precipitate was filtered and washed repeatedly with warm deionized water. The resulting cakes were oven dried at 120° C. for 12 hours and then calcined at 650° C. for 3 hours in an air environment. The support material obtained then was wetness impregnated with metal salt solutions of nickel and cobalt nitrates simultaneously as hereinabove described. The prepared catalyst obtained had a nominal loading of 3 wt % Co and 5 wt % Ni.

Example 11

A mixed oxide based on $Mg_{0.6}Al_{0.3}Ce_{0.05}Zr_{0.05}O_2$ quaternary oxide was prepared by surfactant assisted templating under basic conditions. Aluminum nitrate nonahydrate, cerium nitrate hexahydrate, magnesium nitrate hexahydrate, and zirconium nitrate hydrate precursors were employed to prepare the above support. The cerium nitrate salt (2.2 g) zirconium nitrate salt (1.2 g), aluminum nitrate salt (6.4 g) and magnesium nitrate salt (15.4 g) were dissolved separately in deionized water (400 mL each) and mixed together to obtain a 1.6 L solution. In a separate beaker, 45 g of cetyltrimethylammonium bromide (CTAB) surfactant was dissolved in 1 L of deionized water at 60° C. The above two solutions were mixed together to obtain a 2.2 L solution. An aqueous ammonia solution (25 vol. %) then was added gradually to the solution under vigorous stirring until precipitation was complete (pH 11.6). The precipitate obtained was a gelatinous white-brown colloidal slurry. The slurry was stirred for 60 minutes in a glass reactor, and then transferred into Pyrex glass bottles, and sealed and aged hydrothermally in an air circulated oven for 5 days at 90° C. The mixture then was cooled and the resulting precipitate was filtered and washed repeatedly with warm deionized water. The resulting cakes were oven dried at 120° C. for 12 hours and then calcined at 650° C. for 3 hours in an air environment. The support material obtained then was wetness impregnated with nickel nitrate hexahydrate solution as hereinabove described. The prepared catalyst obtained had a nominal loading of 2 wt % Ni.

Example 12

A mixed oxide based on $Al_{0.92}Ce_{0.04}Zr_{0.02}Ca_{0.02}O_2$ quaternary oxide was prepared by surfactant assisted templating under basic conditions. Aluminum nitrate nonahydrate, cerium nitrate hexahydrate, calcium nitrate tetrahydrate, and zirconium nitrate hydrate precursors were employed to prepare the above support. The cerium nitrate salt (1.7 g), zirconium nitrate salt (0.46 g), aluminum nitrate salt (34.5 g) and calcium nitrate salt (0.5 g) were dissolved separately in deionized water (400 mL each) and mixed together to obtain a 1.6 L solution. In a separate beaker, 42 g of cetyltrimethylammonium bromide (CTAB) surfactant was dissolved in 1 L of deionized water at 60° C. The above two solutions were mixed together to obtain a 2.2 L solution. An aqueous ammonia solution (25 vol. %) then was added gradually to the solution under vigorous stirring until precipitation was complete (pH 11.6). The precipitate obtained was a gelatinous white-brown colloidal slurry. The slurry was stirred for 60 minutes in a glass reactor, and then transferred into Pyrex glass bottles, and sealed and aged hydrothermally in an air circulated oven for 5 days at 90° C. The mixture then was cooled and the resulting precipitate was filtered and washed repeatedly with warm deionized water. The resulting cakes were oven dried at 120° C. for 12 hours and then calcined at 650° C. for 3 hours in an air environment. The support material obtained then was wetness impregnated with both cobalt and nickel nitrate hexahydrate solution as hereinabove described. The prepared catalyst obtained had a nominal loading of 2 wt % Ni and 1% Co.

Example 13

Catalyst Characterization

A few select catalysts were characterized in order to understand the impact of different dopants used and how the manufacturing technique adopted in support preparation has a positive influence on stability of the catalysts when subjected to activity testing. Two samples (Example 11 and Example 12) were used for comparison, in which the supports and catalysts generated in these examples were characterized for X-ray diffraction (XRD), temperature programmed reduction (TPR), BET surface area and scanning electron microscopy. The present example describes the formation of mesoporous materials and using such materials for active metal (such as nickel or cobalt) to act as a catalyst for reforming applications. Nickel based catalysts supported on mesoporous materials normally present high dispersion due to the large specific surface areas and large pore volumes, as well as uniform pore sizes of the carriers (Table 1). Consequently, the highly dispersed Ni particles over the mesoporous framework are able to provide more accessible Ni active centers for the reactants, accounting for the good activity for these materials. Because one of the major reasons causing the deactivation of the reforming catalyst was the thermal sintering of the Ni particles, the sintering of Ni particles seems to be inevitable under severe reduction and reaction conditions. The use of mesoporous materials as supports, however, could help in controlling the thermal sintering at high temperatures effectively.

TABLE 1

Textural characterization

| Sample | BET surface area (m2/g) | Pore volume Cm3/g | Pore size Nm | Isotherm Type |
|---|---|---|---|---|
| Example 8 (support only) | 244 | 0.68 | 9.6 | IV Type H2 |
| E8 (support plus Co and Ni) | 229 | 0.62 | 9.5 | IV Type H2 |
| Example 9 (support only) | 183 | 1.49 | 31.9 | IV Type H2 |
| E9 (support plus Co and Ni) | 172 | 1.11 | 17.5 | IV Type H2 |
| Example 10 (support only) | 225 | 0.38 | 6.3 | IV Type H2 |

TABLE 1-continued

Textural characterization

| Sample | BET surface area (m2/g) | Pore volume Cm3/g | Pore size Nm | Isotherm Type |
|---|---|---|---|---|
| E10 (support plus Co and Ni) | 211 | 0.36 | 6.2 | IV Type H2 |
| Example 11 (support only) | 169 | 0.59 | 9.6 | IV Type H2 |
| E11 (support plus Ni) | 145 | 0.39 | 9.5 | IV Type H2 |
| Example 12 (support only) | 284 | 0.63 | 3.4 | IV Type H2 |
| E12 (support plus Ni and Co) | 240 | 0.62 | 3.4 | IV Type H2 |

It can be seen (Table 1) that upon impregnation of active metal (nickel) or a combination of metals (nickel and cobalt) over the surface of supports, the surface areas and cumulative pore volumes decreased. This is a general phenomenon observed in the case of supported catalysts when an active component is impregnated over its surface. The observed decrease is due mainly to penetration of the dispersed nickel oxide into the pores of the support. The average pore diameter measurements also revealed similar trends; most of the mixed oxide samples also exhibited wider pores. A wider pore size will reduce mass-transfer resistance/limitation to the reforming feed in the catalyst pore networks. The nitrogen adsorption-desorption isotherms as well as pore size distributions of both support and as-synthesized Ni—Co/support calcined at 650° C. as presented in FIG. 1 indicate type IV isotherms with hysteresis loops, which suggest the presence of uniform cylindrical mesopores.

Figure 2:
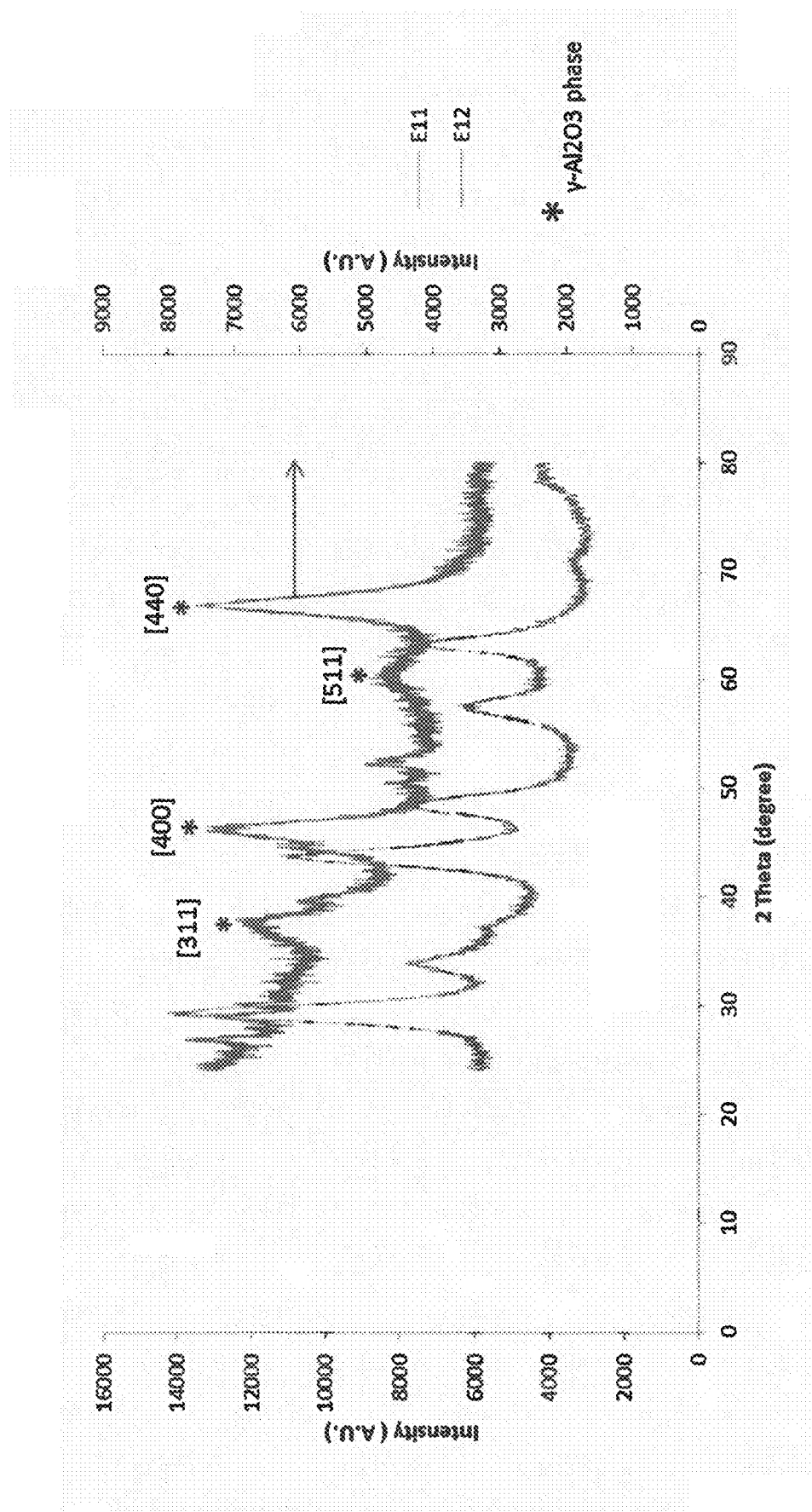
FIG. 2 shows the X-ray diffraction patterns of the catalysts of Examples 11 and 12.

X-ray diffraction patterns (FIG. 2) also reveal that the multi-component metal oxides form solid solutions. In general, the lattice contact tends to decrease as the particle size decreases from bulk (i.e., more than 200 nm) to the nano sizes (i.e., less than 50 nm). Due to the contraction for nano samples, the diffraction lines in general shift to the higher 2-theta values. The catalyst samples prepared in Example 11 and Example 12 were compared, where the higher alumina content sample (Example 12) shows the diffraction lines accredited with $\gamma$-$Al_2O_3$ shifting towards higher 2-theta values. Conversely, the presence of magnesia (Example 11), which has a relatively large ionic radius ($Mg^{2+}$=0.72 A vs $Al^{3+}$=0.53 A) leads to a larger lattice content and consequently the shift towards lower 2-theta values. In other words, the shift in peak positioning can be attributed to the structural distortion caused by the substitution. The XRD patterns of the calcined samples as presented exhibit four distinct diffraction peaks of $\gamma$-$Al_2O_3$ (JCPDS Card No. 10-0426) which are due to the [311], [400], [511], and [440] planes of the $\gamma$-$Al_2O_3$ species. Furthermore, there were no evident characteristic diffraction peaks of the NiO appearing at the loading studied that confirms the high dispersion of NiO among the mesoporous framework.

Figure 3:
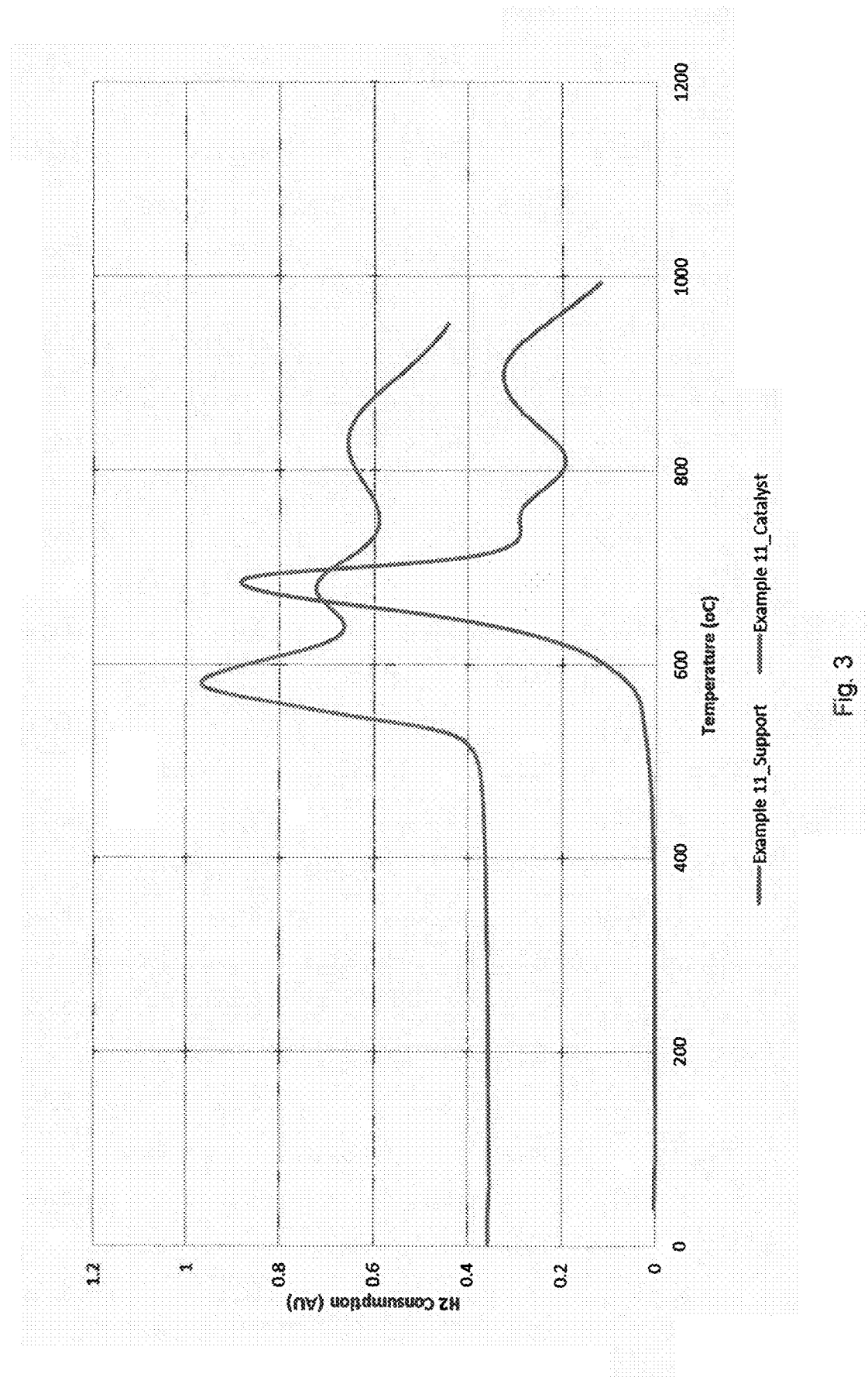
FIG. 3 is a graph showing temperature programmed reduction (TPR) profiles of the support and catalyst of Example 11.

Another parameter that impacts the catalyst stability is the reducibility of the catalyst as it indicates the degree of interactions between metal and support for the metal oxide supported catalyst. The reducibility at lower temperatures is preferred because it indicates a facile formation of the spinel-like species especially in the case of lower Ni loading and a relatively higher alumina percentage. The peak in general associated with a relatively weak interaction of nickel with the mesoporous framework is centered below 600° C. (FIG. 3). A high reducibility at relatively lower temperatures is the key for a good catalytic performance and, in particular, for syngas production as it allows the active site to remain in a reduced state. On the other hand, reducibility at higher temperatures would indicate nickel either in the form of a bulk crystallite (too high loading), or nickel that is embedded deeply into the support structure such as in spinel formation (too low loading). Therefore, TPR technique determines the Ni loading as required on different types of supports. Also there is no bulk nickel reduction peak, indicating the dispersion is nearly complete.

Figure 4:
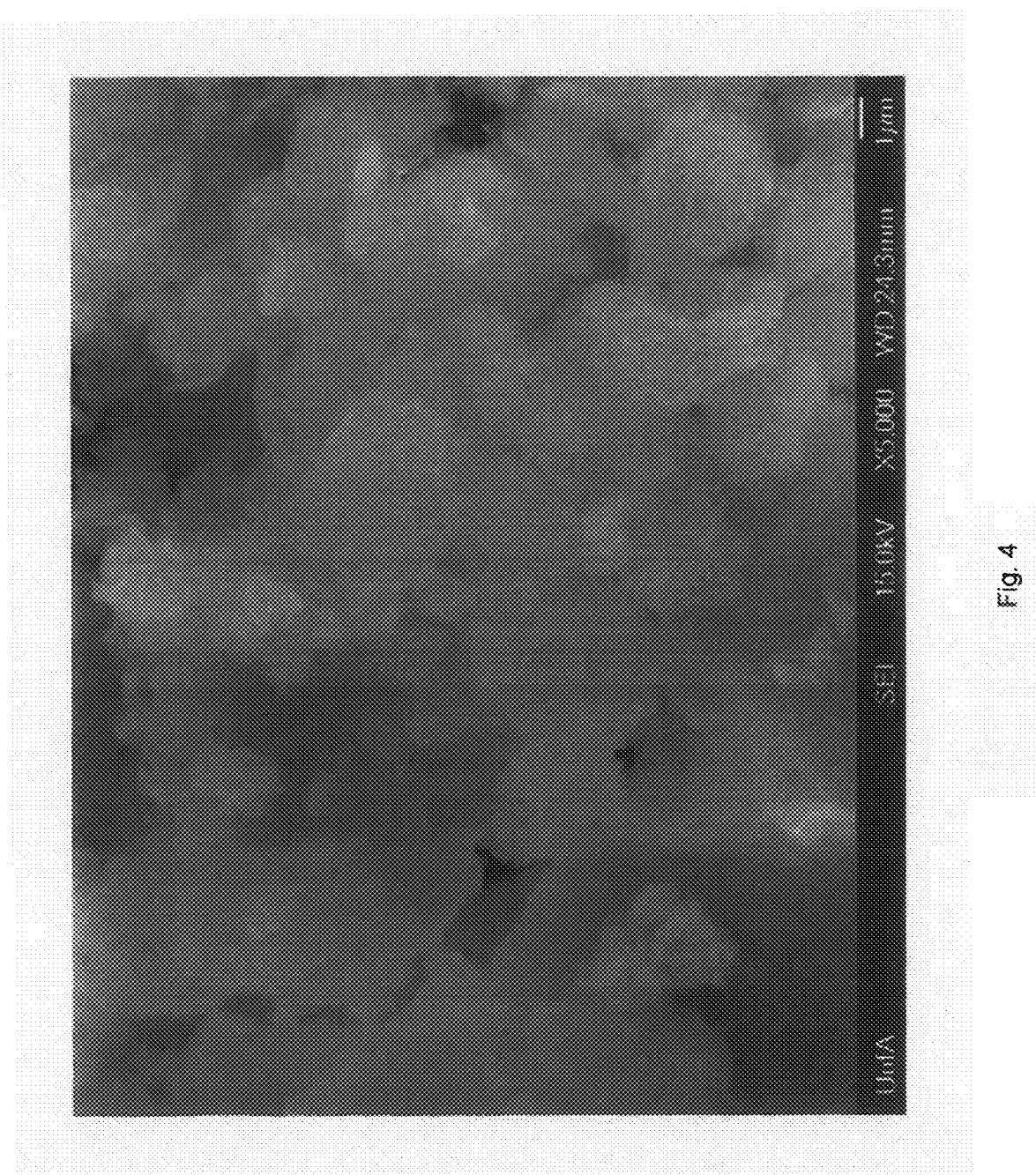
FIG. 4 is a scanning electron micrograph (SEM) image of the catalyst of Example 11.
Figure 5:
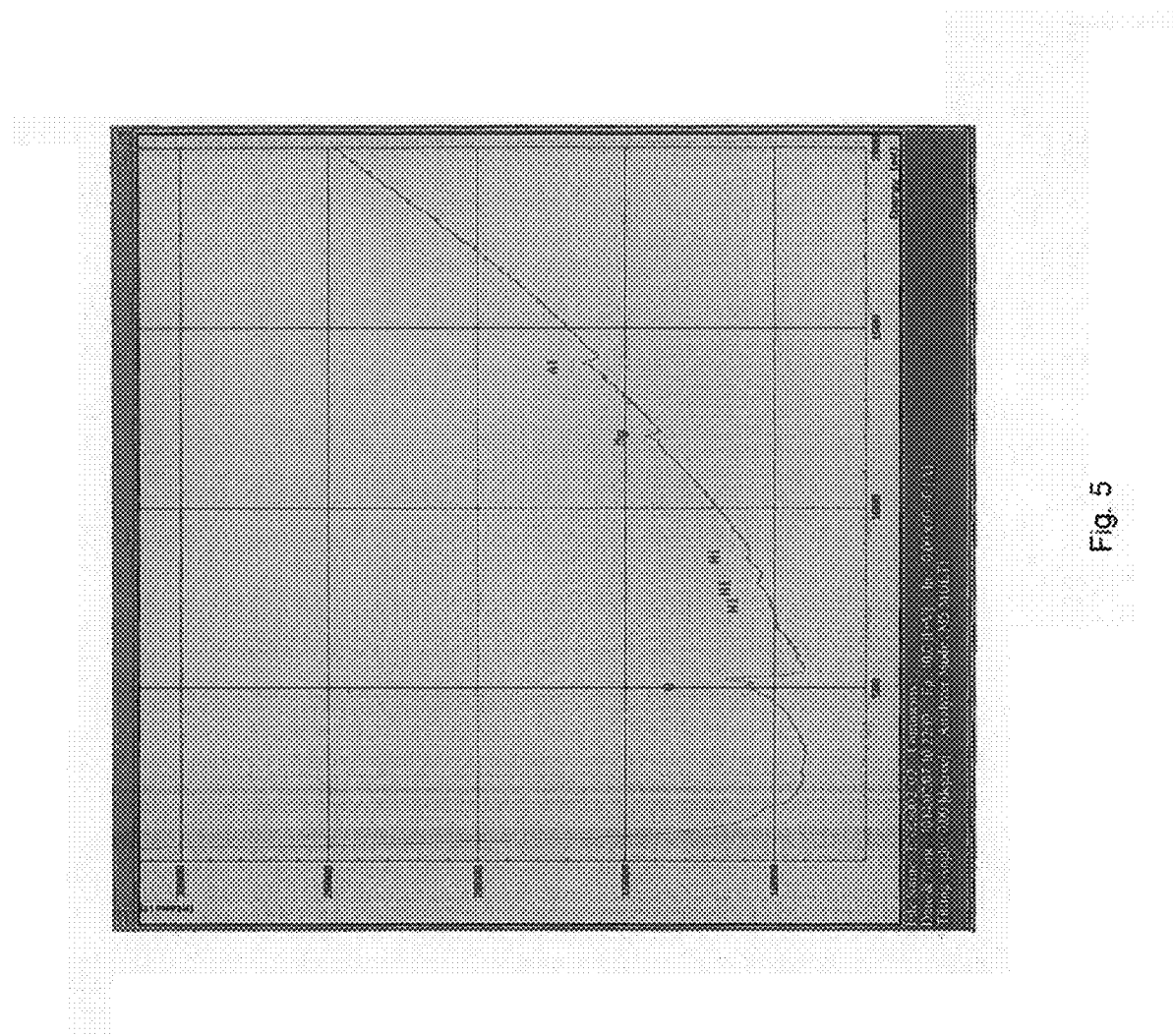
FIG. 5 is an energy dispersive X-ray spectroscopy (EDS) profile of the catalyst of Example 11.
Figure 6:
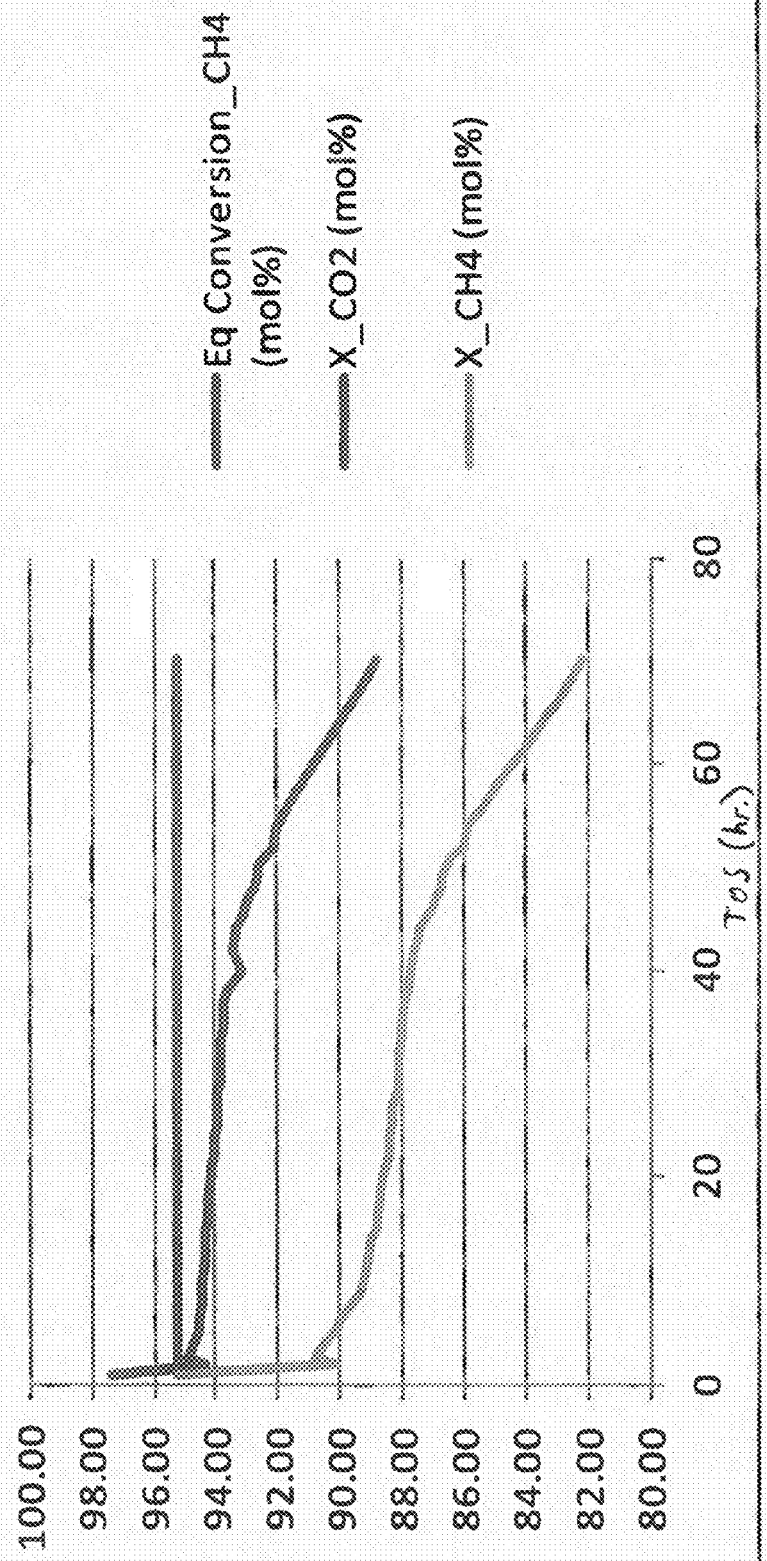
FIGS. 6 through 11 are graphs showing conversion trends for each of the six reactions (Cases 1 through 6, respectively) described in Example 14.
Figure 7:
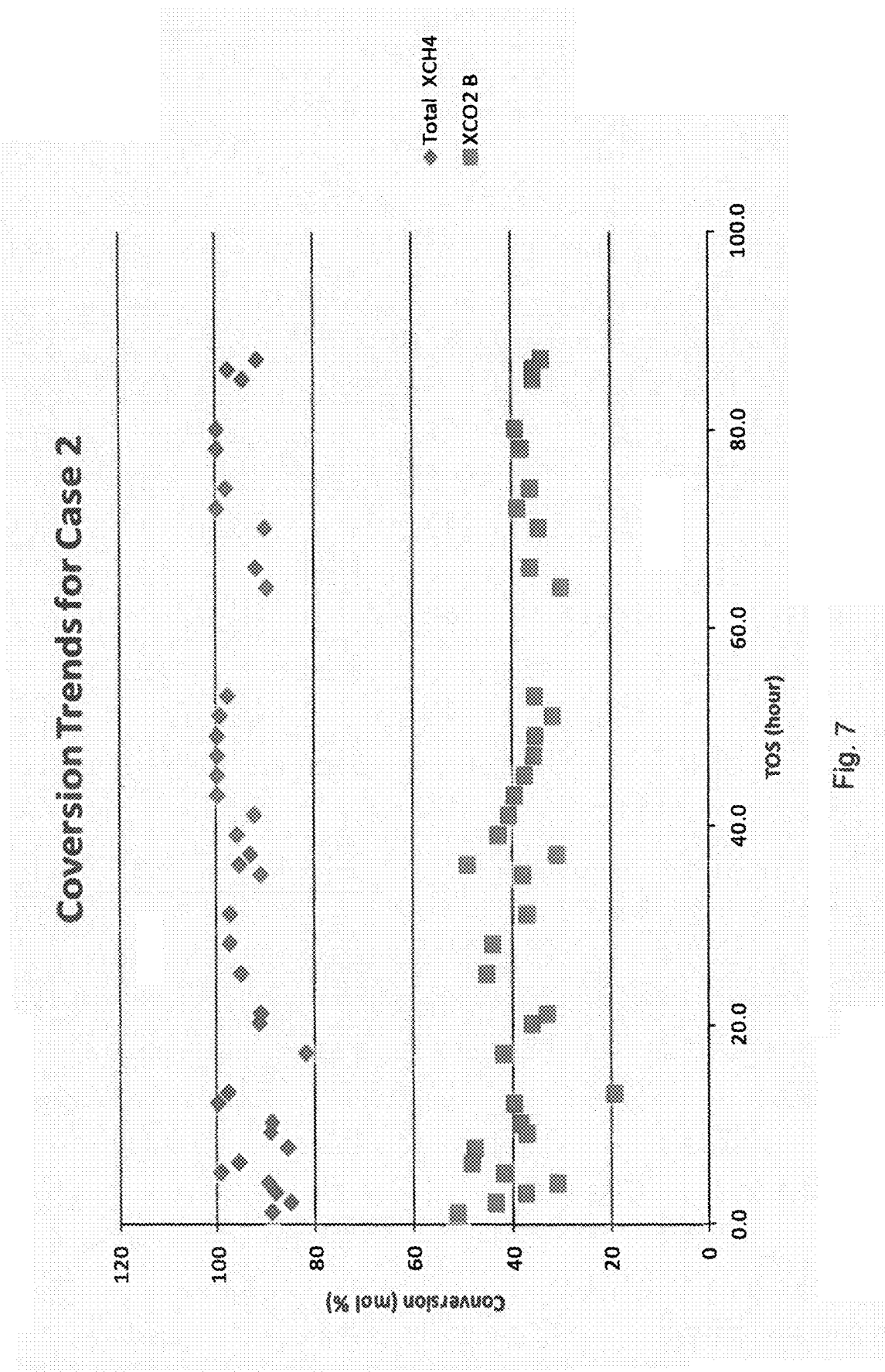
Figure 8:
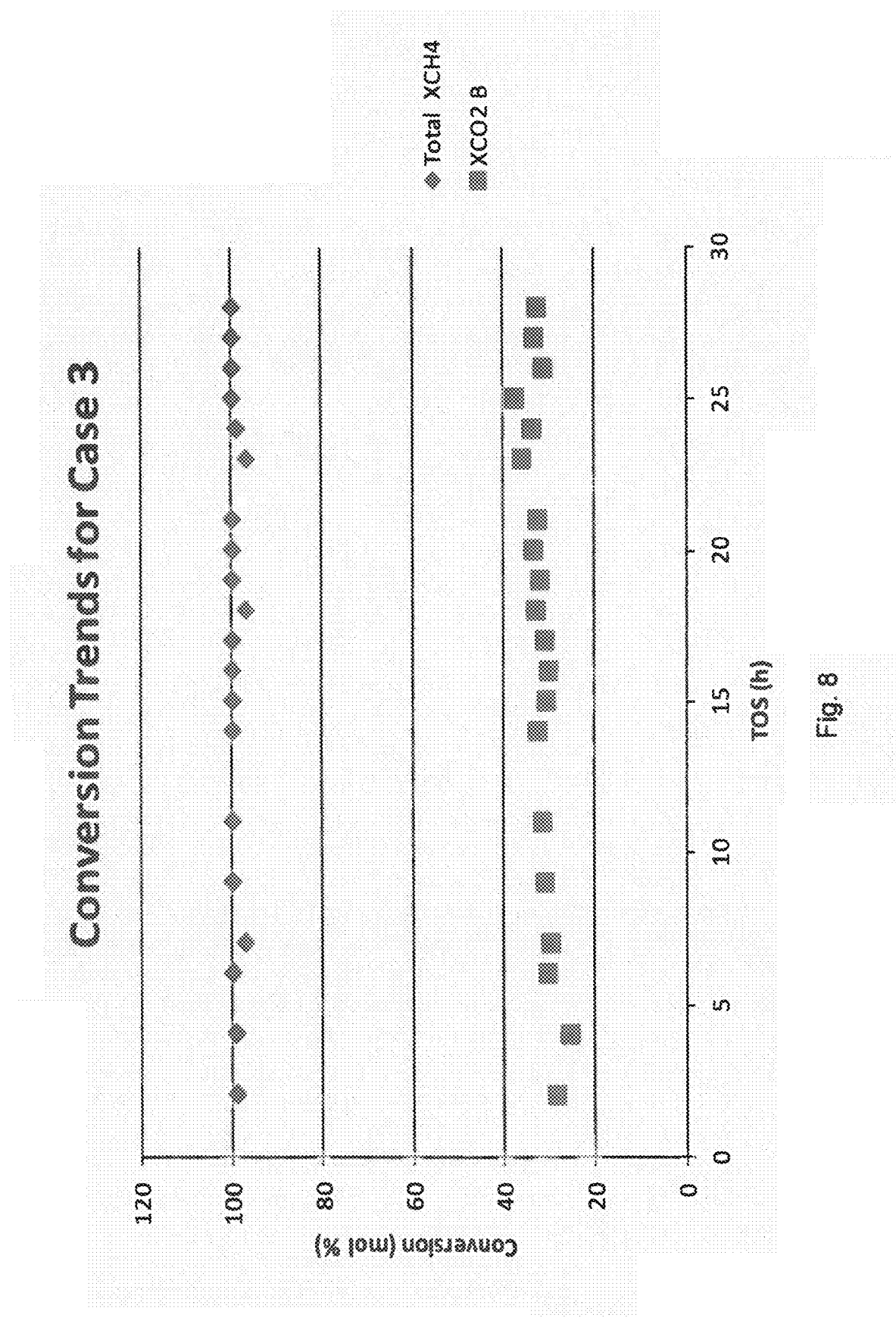
Figure 9:
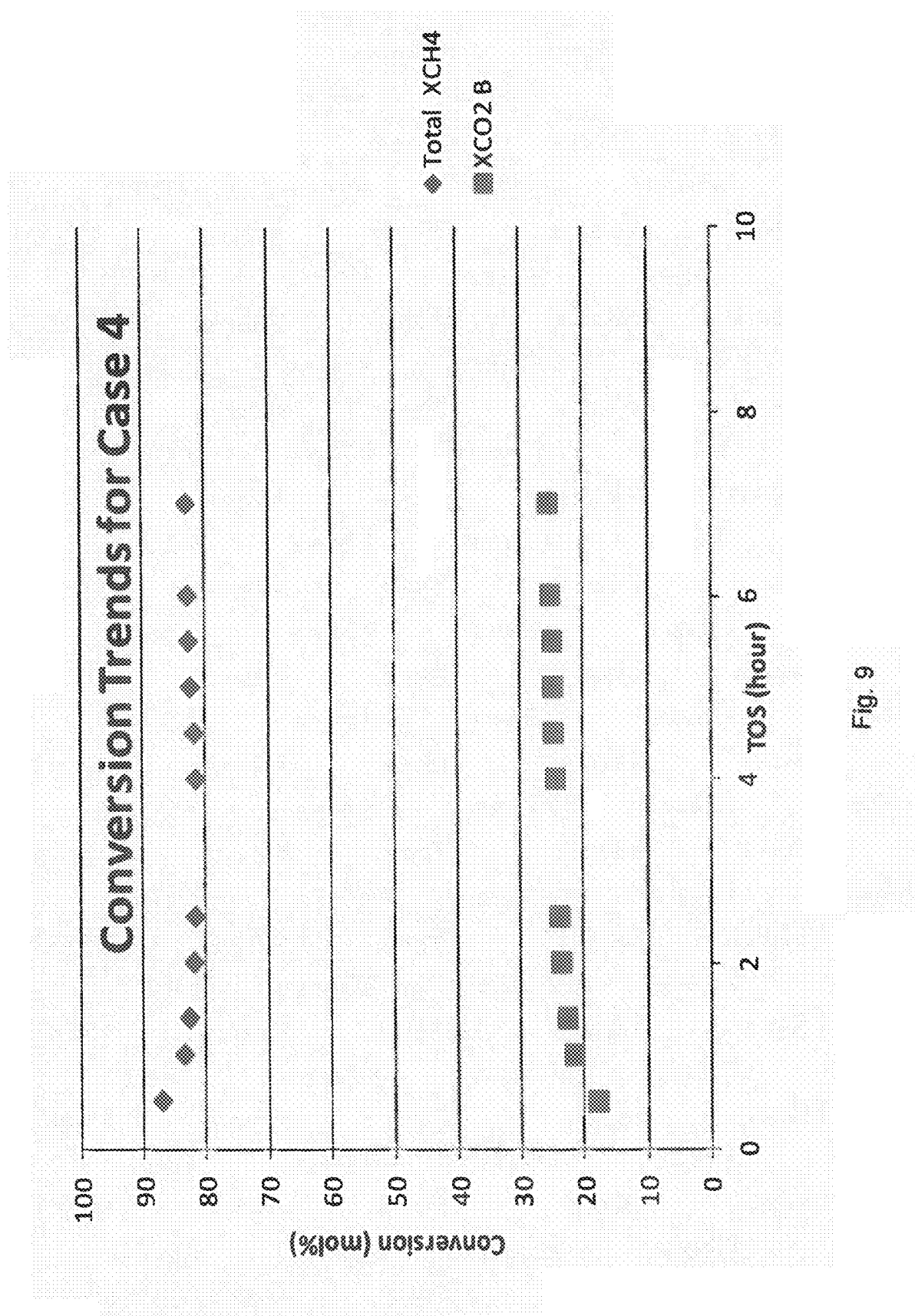
Figure 10:
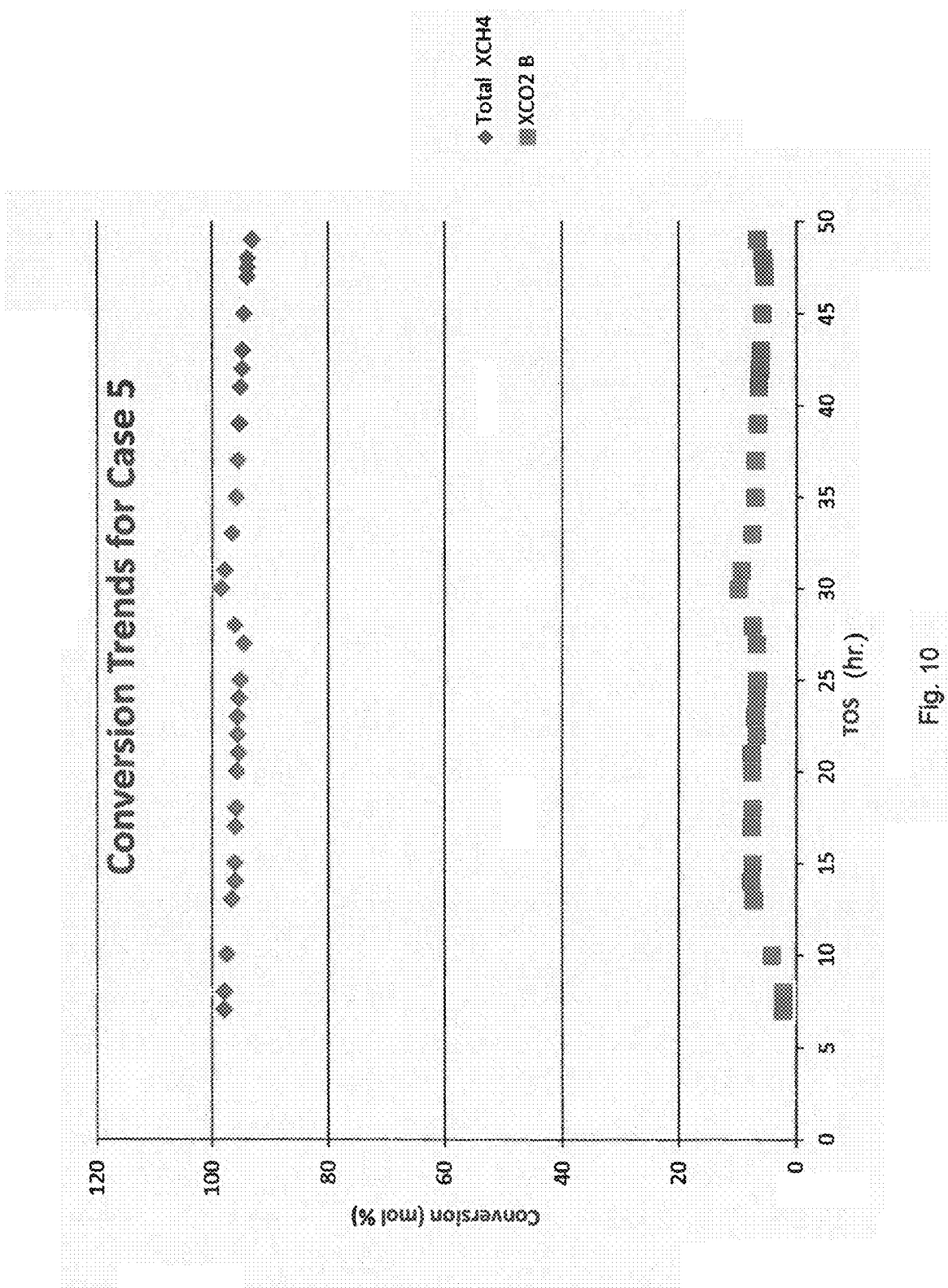
Figure 11:
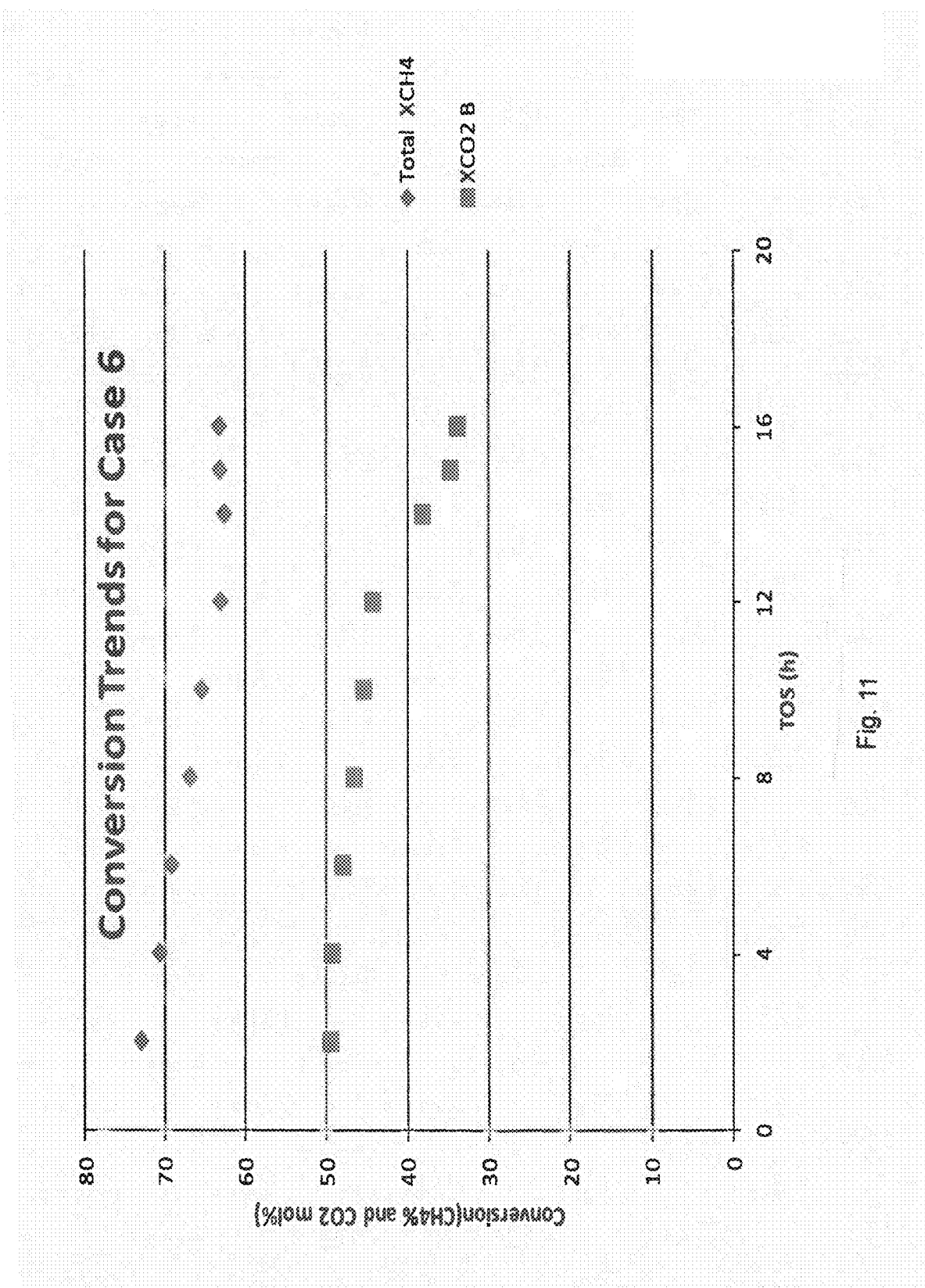

Furthermore, the catalyst as prepared in Example 11 was used for generating a scanning electron micrograph. (FIG. 4). In scanning electron microscopy (SEM), an electron beam is scanned across a sample's surface. When the electrons strike the sample, a variety of signals are generated, and it is the detection of specific signals which produces an image or a sample's elemental composition. The three signals which provide the greatest amount of information in SEM either are secondary electrons or X-rays. Secondary electrons are emitted from the atoms occupying the top surface and produce a readily interpretable image of the surface. The contrast in the image is determined by the same morphology. A high resolution image can be obtained because of the small diameter of the primary electron beam. The interaction of the primary beam with atoms in the sample causes shell transitions which result in the emission of an X-ray. The emitted X-ray has an energy characteristic of the parent element. Detection and measurement of the energy permits elemental analysis. Energy Dispersive X-ray Spectroscopy, or EDS, can provide rapid qualitative, or with adequate standards, quantitative analysis of elemental composition with a sampling depth of 1-2 microns. X-rays also may be used to form maps or line profiles, showing the elemental distribution in a sample surface (FIG. 5).

Example 14

Catalyst Testing

An Inconel packed bed tubular reactor (i.e. =½") housed in a furnace with a single heating zone was used for catalyst performance evaluation. The gas flows were metered and regulated by an Omega digital flow controller (DFC 6500). The catalyst bed temperature was measured by means of a sliding thermocouple dipped inside the catalyst bed. The diluent used in the catalyst bed was quartz sand (Caledon Laboratories) having a particle size of 0.3 mm, similar to the catalyst. Pure α-$Al_2O_3$ (Sasol) beads of 0.5 mm also were used in the preheating zone. In order to approach plug flow conditions and minimize back mixing and channeling, certain operating criteria such as the ratio of catalyst bed length to catalyst particle size ($L/D_p$) was maintained at more than 400 and the ratio of the inside diameter of the reactor to particle size ($D/D_p$) was 42. Prior to each experimental run for catalyst evaluation, the catalyst was activated by in situ reduction at 700° C. with 5% $H_2$ in $N_2$ (Airgas, Edmonton, Canada). The catalyst test was accomplished at 850° C. by using a gas-mixture ($CO_2/CH_4$ mole ratio 1) as a feed. The feed and product gases were analyzed with an on-line gas chromatograph (7820, Agilent Technologies) equipped with a TCD (thermal conductivity detector) using a Haysep Q column and a Molsieve 13X column (Alltech Associates) for complete separation of the gaseous components. The experiments were conducted at pressures from atmospheric pressure up to 60 psig under a plug flow regime. The carbon present on the catalyst is analyzed for CHN (carbon, hydrogen, and nitrogen) in order to obtain the C-balance. The amount of water formed is due to the reverse-water-shift reaction (RWGS) and is collected and a materials balance was achieved. The amount of water formed is dependent on the catalyst and the reaction temperature. The total gas volume after the reaction was calculated based on $N_2$ that was used as an internal standard in the feed mixture. The conversions of $CH_4$ and $CO_2$, and selectivity of $H_2$, are defined as follows:

$$\text{Conversion } (CH_4)\% = \frac{(CH_4)in - (CH_4)out}{(CH_4)in} \times 100$$

$$\text{Conversion } (CO_2)\% = \frac{(CO_2)in - (CO_2)out}{(CO_2)in} \times 100$$

$$\text{Selectivity of } H_2(\%) = \frac{(H_2)out}{(CH_4)in - (CH_4)out} \times \frac{100}{2}$$

One of the important considerations for a reforming operation using a nickel and/or cobalt based catalyst is the stability of the catalyst for an extended period of time. At high temperatures the Boudouard reaction is limited thermodynamically, suggesting that it is desirable to operate at high temperatures, however, methane decomposition is favored at high temperatures; meaning that there is a need to optimize the temperature and the steam-to-carbon (S/C) ratio, which is defined as moles of steam present in the feed divided by the total carbon present at the given feed rate, represented as moles per minute, to minimize the thermodynamic driving force for carbon deposition from associated side reactions. These performances are recorded under different conditions in order to evaluate the stability trend (a plot of conversion of both $CH_4$ and $CO_2$ vs time-on-stream (TOS) of the chosen catalyst and the catalyst was tested for up to 217 hours under different conditions. For the simplicity of this experiment, the same catalyst was tested, starting with case 1 (TOS=from zero to 25 hours, a dry reforming condition) and ending with case 6 (TOS=from zero to 25 hours, a dry reforming condition) and ending with case 6 (TOS=201 to 217 hours, an autothermal reforming (ATR) condition w/o oxygen). Up to case 5 there was no plugging of the reactor, indicating that the catalyst remained active up to 201 hours. The objective was to see the catalyst deactivation trend under different S/C ratios and how the stoichiometry changed when both steam and $CO_2$ are present. The temperature was kept constant at 850° C. while the flow rate of gas and steam was varied to change the GHSV (/h). Three parameters, conversion of methane (X $CH_4$ mol %), conversion of $CO_2$ (X $CO_2$ mol %) and the product $H_2$/CO ratio were taken into consideration to evaluate the impact of S/C ratio. Only in one condition with a very low S/C ratio (S/C=0.46) has the catalyst performed poorly, and a slow plugging of the reactor was observed, and the reaction was stopped. It also was noticed that presence of steam affected largely the $CO_2$ conversion while methane conversion is affected little. There was a significant change in the $H_2$/CO ratio, and that depends on GHSV to a greater extent.

The catalyst was prepared by wetness impregnation of the support of Example 5 with a 5 wt. % nickel solution. 0.5 g of nickel nitrate hexahydrate solution was dissolved in 10 ml deionized water. The solution then was mixed with 1.9 g of the support of Example 5. The wet sample, i.e., the support and the nickel nitrate solution, was stirred overnight at room temperature to obtain a homogeneous precipitate which was dried overnight at 110° C. The dried catalyst was cleaned further by heating the catalyst in the presence of air for 3 hrs. at 650° C. to remove all other impurities. The catalyst then was sieved to provide catalyst particles having a size of about 0.3 mm. The catalyst then was tested in six cases as summarized and presented in Table 2 below.

TABLE 2

| Case | GHSV (h$^{-1}$) | S/C | Pressure (psig) | Total Flow (ml/min) | Average X_CH$_4$ (mol %) | Average X_CO$_2$ (mol %) | H$_2$/CO Ratio | TOS (hours) | Stability Trend |
|---|---|---|---|---|---|---|---|---|---|
| 1 | 1350 | 0 | Atmos | 100 | 87 | 93 | 1.19 | 70 | Stable |
| 2 | 2100 | 1.5 | Atmos | 162 | 95 | 38 | 2.3 | 90 | Stable |
| 3 | 2500 | 3.0 | 25 | 112 | 99 | 32 | 2.6 | 30 | Very Stable |
| 4 | 3700 | 0.9 | 60 | 68 | 83 | 24 | 2.4 | 7 | Very Stable |
| 5 | 4800 | 1.8 | 60 | 87 | 96 | 7 | 3.4 | 49 | Very Stable |
| 6 | 6500 | 0.46 | 60 | 118 | 67 | 43 | 1.8 | 16 | Slow Plugging |

The comparative data on conversion trends for each of the cases are shown in FIGS. 6 through 11.

Figure 12:
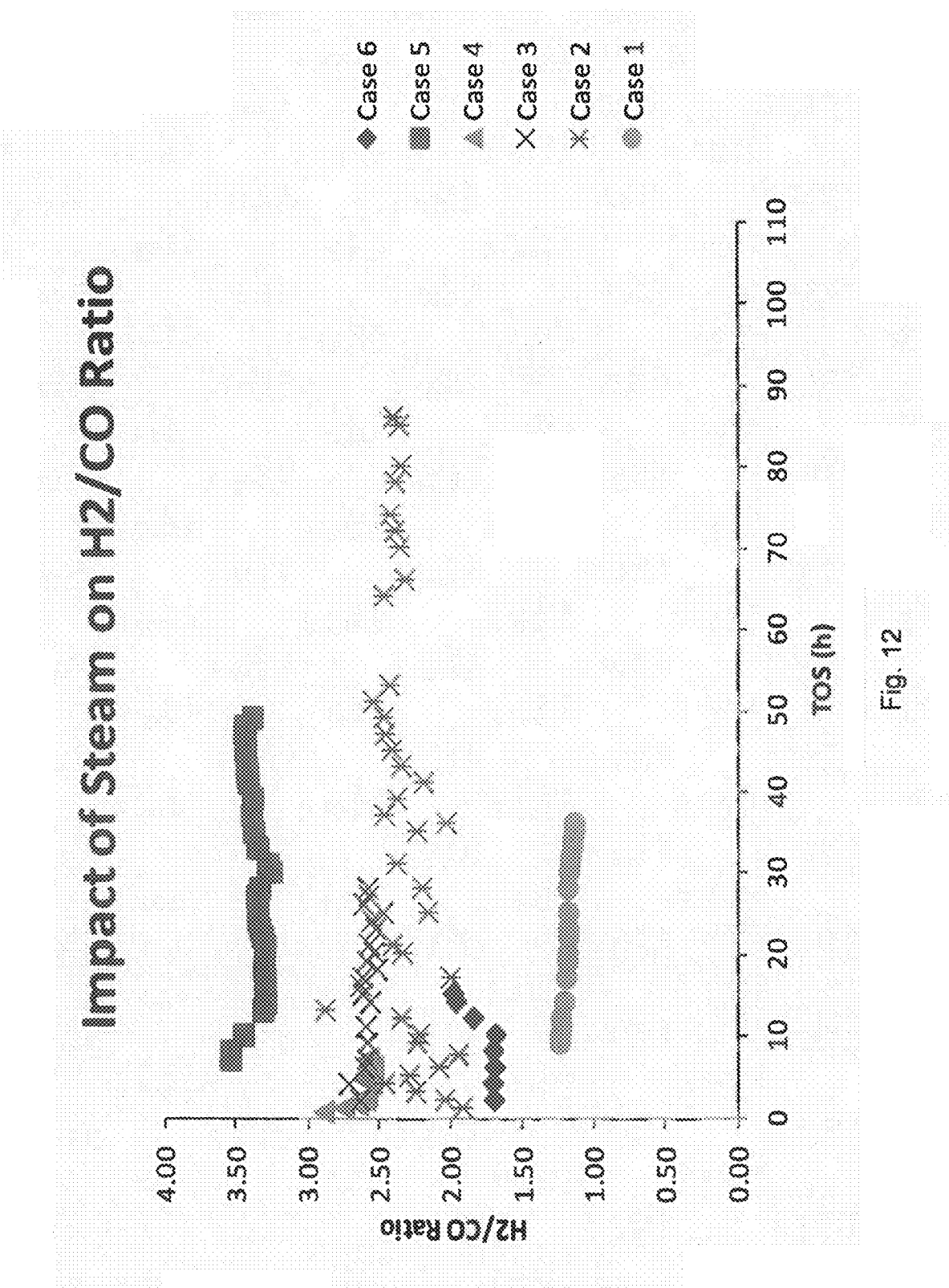
FIG. 12 is a graph showing the impact of steam on the $H_2/CO$ ratio in each of Cases 1 through 6.

The impact of steam on the H$_2$/CO ratio for each of Cases 1 through 6 is shown in FIG. 12.

The disclosures of all patents and publications (including published patent applications) are incorporated herein by reference to the same extent as if each patent and publication were incorporated individually by reference.

It is to be understood, however, that the scope of the present invention is not to be limited to the specific embodiments described above. The invention may be practiced other than as particularly described and still be within the scope of the accompanying claims.

What is claimed is:

1. A catalyst comprising nickel, cobalt, and a mixed oxide containing magnesium and aluminum, wherein said catalyst includes, on a metal atom basis, 4 atom % nickel, 3 atom % cobalt, 60 atom % magnesium, and 33 atom % aluminum.

* * * * *